Sept. 10, 1935.    D. G. RIDENOUR    2,013,898
ARTIFICIAL LURE
Filed June 15, 1933
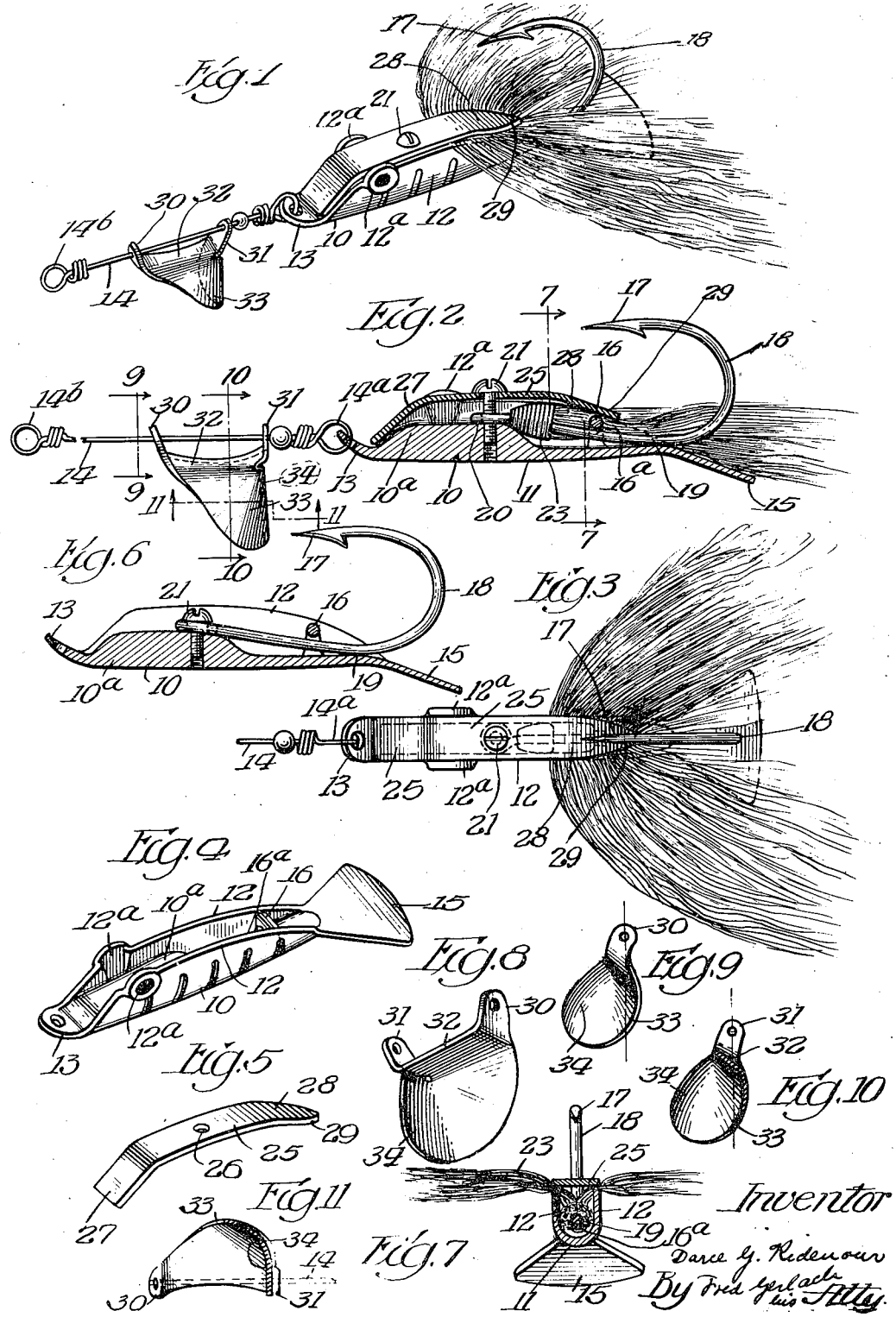

Patented Sept. 10, 1935

2,013,898

UNITED STATES PATENT OFFICE 2,013,898

ARTIFICIAL LURE

Darce G. Ridenour, Cleveland, Ohio

Application June 15, 1933, Serial No. 675,874

12 Claims. (Cl. 43—42)

The invention relates to artificial lures for fish.

One object of the invention is to provide an improved lure which comprises an upstanding hook fixedly secured to a rigid body and means to coact with the hook for preventing fish from releasing the hook.

Another object of the invention is to provide a lure with a fish-like body having a fan-shaped tail beneath the hook to assist in deflecting weeds from the hook and balancing the body to prevent it from spinning.

A further object of the invention is to provide an improved lure which comprises a fibrous member or bucktail adjacent the hook and attached to the body of the lure and a device whereby the fibrous member will be flattened substantially into a lateral plane.

A still further object of the invention is to provide an improved spinner which will cause the body to vibrate as it is drawn through the water, and is shaped so it will deflect weeds.

Other objects of the invention and the various characteristics and advantages will be apparent from a consideration of the following detailed description.

The invention consists in the several novel features which are hereinafter set forth and are more particularly defined by claims at the conclusion hereof.

In the drawing: Figure 1 is a perspective of a lure embodying the invention. Fig. 2 is a vertical longitudinal section. Fig. 3 is a plan. Fig. 4 is a detail perspective of the body. Fig. 5 is a perspective of the spreader and cover strip for the bucktail. Fig. 6 is a vertical longitudinal section illustrating the lure without the spreader strip. Fig. 7 is a transverse section on line 7—7 of Fig. 2. Fig. 8 is a perspective of the spinner. Fig. 9 is a section on line 9—9 of Fig. 2. Fig. 10 is a section on line 10—10 of Fig. 2. Fig. 11 is a section on line 11—11 of Fig. 2.

The invention is exemplified in a lure comprising a rigid metal body 10 which is relatively narrow and it is sufficiently long to present a fish-like appearance. This body comprises a lower wall 11 with integral upstanding ribs forming substantially parallel body-sides 12 with a channel in the top thereof, a perforated inclined lug 13 at its front end for connection to spinner-rod 14, a transversely extending fan-shaped tail 15, and a bridge or lug 16 extending between the side walls 12 in front of the tail. Adjacent the front of the body the sides 12 are shaped and decorated to form eyes 12ª.

A hook which comprises a barb 17, a crook 18, a shank 19, and an eye 20 at its front end, is fixedly secured by a screw 21 to the body 10. A fibrous member or bucktail 22 is secured by a wrapping 23 to the shank 19 of the hook at a point adjacent to the eye 20. The wrapping and front portion of the fibers of the bucktail are adapted to lie within the channel between the sides 12 and are of sufficient length to extend over the bridge 16 and laterally and rearwardly of the crook 18 of the hook. The shank 19 of the hook extends through an opening 16ª in the bridge 16 so that when the screw 21 is tightened, the hook will be clamped in the channel in the body and be secured in an upstanding position on the body.

The front portion of the body 10 is thickened, as at 10ª, to provide sufficient weight and the fantail 15 is sloped downwardly and rearwardly to balance the body and prevent it from spinning as it is drawn through the water. The tail extends beneath and terminates adjacent the rear of the hook, in order positively to deflect weeds from the hook.

In some instances, it is desirable to flatten the bucktail laterally so its fibers will project laterally in an approximately flat plane and diverge rearwardly along the sides of the hook so the fibers will be kept spread apart. For this purpose, a cover strip or plate 25 is secured on top of the body 10. This strip 25 is provided with a hole 26 through which the screw 21 passes to secure the strip removably on the top of the body and the bucktail. The rear portions of the fibers of the bucktail 22, extend rearwardly from the wrapping 23 and eye 20 of the hook over the bridge 16. This results from slipping the point of the hook through the hole 16ª in the bridge 16 in assembling the hook and body 10 before the eye of the hook is secured by screw 21. The rear portion of the strip 25 is curved downwardly as at 28 and terminates in a point 29 so that the rear ends of the fibers will be spread into a transverse plane and project from the sides of the hook as shown in Fig. 3. The side margins of the strip rest on or overlie the top edges of the body-sides 12. When the plate is secured in place over the eye and shank of the hook and over the wrapping 23 of the bucktail, its rear end will be pressed downwardly to flatten the bucktail so it will extend laterally from the body as illustrated in Fig. 3. This spreader strip also serves as a cover for the top of the body. The front end of the strip is inclined downwardly as at 27 to fit over the front portion of the body behind the lug 13.

The rear portion 28 of the strip 25 and the rear portions of the top edges of side walls 12 of the body are inclined rearwardly and downwardly and are disposed to underlie the barb of the fish hook. This results in rearward divergence between the upper portion of the hook and the rear portion of the body and plate 25, so the space across the point of the hook and the strip 25 or body-sides 12 will be less than the distance between the rear end of the strip and the body in back of the barb of the hook. When the flesh of the fish is caught on the crook of the hook and the fish attempts to throw the hook, the contracted space between the point of the hook and the plate 25 and the body will render it difficult for the flesh to be released from the hook. When the lure is used without the strip 25, the upper edges of the side walls 12 behind the bridge 16 will similarly prevent the throwing of the hook by the fish because they are also rearwardly divergent with respect to the upper portion of the hook.

In some instances it is desirable to use a plain hook or one without a bucktail. For this purpose, the strip 25 can be removed and screw 21 will be applied to secure the eye 20 of the fish hook to the body as illustrated in Fig. 6.

The spinner rod 14 is provided at its rear end with an eye 14ª to which the lug 13 is connected and at its front end with an eye 14ᵇ for attachment of a line. The improved spinner is formed of a plate of thin metal which is bent to form a front ear 30 and a rear ear 31 having holes therein through which the spinner rod 14 passes. A longitudinal wall 32 connects the ears and is oblique to the plane of rotation. The spinner blade comprises a radially curved side 33 with its edge extending helically rearward from one side of the front ear 30 to a transverse back wall 34 which is formed by bending the portion of the blank from which the spinner is formed into a substantially transverse plane or at right angles to the plane of rotation. The upper edge of wall 34 terminates at the outer face of the connecting wall 32 and its lower end is curved and merges into the lower and rear edge of the helically curved side wall 33. The front ear slopes rearwardly to the wall 31 and to the point where the helical edge of the side wall 32 commences to deflect weeds from the front end of the spinner. The purpose of providing the cross wall 34 at the rear of the spinner is to form the rear end of the spinner so it will offer resistance to the water and the helical side portion extending from the front ear to the rear wall will cause the rapid rotation of the spinner and deflect weeds from the lure.

The invention is not to be understood as restricted to the details set forth since these may be modified within the scope of the appended claims without departing from the spirit and scope of the invention.

Having thus described the invention, what I claim as new and desire to secure by Letters Patent, is:

1. In an artificial lure, the combination of an elongated body relatively narrow in width and provided with substantially parallel upstanding ribs forming sides and with means at its front end whereby it may be connected to a line, a hook, means for securing the front of the hook to the body, the body having a longitudinally extending channel between said ribs open at it front and rear ends, adapted to receive the shank of the hook, and a plate secured on the top of the body and extended to form a cover for closing the top and the front and rear ends of the channel.

2. In an artificial lure, the combination of an elongated body relatively narrow in width and provided with substantially parallel upstanding ribs forming sides and with means at its front end whereby it may be connected to a line, a hook, means for securing the front of the hook to the body, the body having a longitudinally extending channel between said ribs, adapted to receive the shank of the hook, and a plate secured on the top of the body and extended over the ribs and channel to form a cover for the top of the body and having a downwardly and forwardly extending portion at its front end extending over the front of the channel.

3. In an artificial lure, the combination of an elongated body relatively narrow in width and provided with substantially parallel upstanding ribs forming sides and with means at its front end whereby it may be connected to a line, a hook, means for securing the front of the hook to the body, the body having a longitudinally extending channel between said ribs, adapted to receive the shank of the hook, a fibrous member attached to the hook, with its fibers extending rearwardly over the body, and a plate secured on the top of and forming a cover for the body and having its rear end narrowed substantially to a point and terminating over the shank of the hook and on top of the fibers.

4. In an artificial lure, the combination of a body having its front end adapted for connection to a line, a hook provided with an eye at its front end, means for securing the eye to the body, a fibrous member secured to the hook, and a longitudinally extending plate secured to the body with its rear end tapered substantially to a point and extending over the body to clamp the fibers between the plate and the body so as to flatten the fibrous member so that the fibers will be held in an approximately flat transverse plane, the rear end of the plate terminating over the shank of the hook.

5. In an artificial lure, the combination of a body having its front end adapted for connection to a line, a hook provided with an eye at its front end, a fibrous member secured to the hook, having its fibers extending rearwardly and over the body, a longitudinally extending plate fitting over the top of the body and having its rear end tapered substantially to a point and formed to clamp the fibers against the top of the body and over the shank of the hook to spread them into approximately a transverse plane, and means for securing the plate and hook to the body.

6. In an artificial lure, the combination of an elongated body relatively narrow in width and provided with means at its front end whereby it may be connected to a line, a hook, means for rigidly and removably securing the front of the hook to the body, the body having on its top a longitudinally extending channel adapted to receive the shank of the hook, and a fan-shaped tail at the rear of and integral with the body and underlying the crooked portion of the hook extending rearwardly and slightly downwardly so that it serves to balance the body and prevent the lure from spinning.

7. In an artificial lure, the combination of an elongated body relatively narrow in width and provided with substantially parallel upstanding ribs at its sides, and with means at its front end whereby it may be connected to a line, a hook, means for rigidly and removably securing the front of the hook to the body, the body having on its top a longitudinally extending channel between the sides adapted to receive the shank of the hook, and a fan shaped tail at the rear of and integral with the body and underlying the crooked portion of the hook extending rearwardly and slightly downwardly so that it serves to balance the body and prevent the lure from spinning.

8. In an artificial lure, the combination of an elongated body relatively narrow in width and provided with substantially parallel upstanding ribs forming sides and with means at its front end whereby it may be connected to a line, a hook, means for securing the front of the hook to the body, the body having a longitudinally extending channel between the ribs adapted to receive the shank of the hook, a plate for closing the channel removably secured to the body and a fan shaped tail at the rear of and integral with the body and underlying the hook, the body having a bridge in front of the tail, through which the shank of the hook extends, the rear end of the plate terminating over the shank of the hook.

9. In an artificial lure, the combination of a body provided at its front end with means whereby it may be connected to a line, a hook comprising a shank adapted to extend over the body, means for rigidly and removably securing the front end of the shank to the body to secure the hook in upstanding position, and a plate on the top of the body and extended rearwardly of and under the point of the upstanding hook, having an inclined rear end which is rearwardly divergent with respect to the point of the hook and terminates over the shank of the hook to form a restricted gap forwardly of the crook of the hook to prevent the fish from releasing the hook.

10. In an artificial lure, the combination of a body having its front end adapted for connection to a line, an upstanding hook provided with an eye at its front end, and means for rigidly and removably securing the eye to the body, the body having a fan-shaped tail under the crook of the hook extending rearwardly and slightly downwards and serving to balance the lure and to prevent it from spinning.

11. In an artificial lure, the combination of a spinner rod and a spinner formed of a plate of metal comprising perforated ears at the front and back through which the rod extends, a longitudinal wall connecting the ears and substantially parallel with the axis of the rod, an integral transversely extending substantially radial rear wall, and a curved side wall extending as a continuation from the longitudinal wall and having a helical edge extending continuously from one side of the front ear to and merging into the lower end of the rear wall.

12. In an artificial lure, the combination of a spinner rod and a spinner formed of a plate of metal and comprising perforated ears at the front and back through which the rod extends, a longitudinal wall alongside of the rod, extending between and connecting the ears and bulging slightly outwards from the rod, an integral transversely extending rear wall, and a curved side wall joined to and extending from one side of the longitudinal wall and having a helical edge extending from one side of the front ear to and merging with the lower end of the rear wall.

DARCE G. RIDENOUR.